(12) United States Patent
Pflueger et al.

(10) Patent No.: US 10,797,365 B2
(45) Date of Patent: Oct. 6, 2020

(54) BATTERY MODULE

(71) Applicant: Robert Bosch GmbH, Stuttgart (DE)

(72) Inventors: Claus Gerald Pflueger, Markgröningen (DE); Mario Kustosch, Vaihingen/Enz (DE); Markus Schmitt, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 16/141,786

(22) Filed: Sep. 25, 2018

(65) Prior Publication Data

US 2019/0097287 A1 Mar. 28, 2019

(30) Foreign Application Priority Data

Sep. 26, 2017 (DE) .................. 10 2017 217 114

(51) Int. Cl.
| | | |
|---|---|---|
| *H01M 10/6557* | (2014.01) | |
| *H01M 2/10* | (2006.01) | |
| *H01M 10/6556* | (2014.01) | |
| *H01M 10/6567* | (2014.01) | |
| *H01M 10/6551* | (2014.01) | |
| *H01M 10/6555* | (2014.01) | |
| *H01M 10/613* | (2014.01) | |
| *H01M 10/647* | (2014.01) | |
| *H01M 10/6562* | (2014.01) | |

(52) U.S. Cl.
CPC ..... *H01M 10/6557* (2015.04); *H01M 2/1061* (2013.01); *H01M 2/1077* (2013.01); *H01M 10/613* (2015.04); *H01M 10/647* (2015.04); *H01M 10/6551* (2015.04); *H01M 10/6555* (2015.04); *H01M 10/6556* (2015.04); *H01M 10/6567* (2015.04)

(58) Field of Classification Search
None
See application file for complete search history.

(56) References Cited

U.S. PATENT DOCUMENTS

| | | | |
|---|---|---|---|
| 2013/0084481 A1* | 4/2013 | Yoon ............... | H01M 2/1077 429/99 |
| 2014/0087231 A1* | 3/2014 | Schaefer ......... | H01M 2/1072 429/120 |
| 2014/0090824 A1 | 4/2014 | Hirsch et al. | |
| 2014/0255749 A1 | 9/2014 | Geise | |

(Continued)

FOREIGN PATENT DOCUMENTS

| | | |
|---|---|---|
| DE | 102012217874 | 4/2014 |
| DE | 102013203966 | 9/2014 |

(Continued)

*Primary Examiner* — Ula C Ruddock
*Assistant Examiner* — Amanda Rosenbaum
(74) *Attorney, Agent, or Firm* — Michael Best & Friedrich LLP (57) ABSTRACT

The invention relates to a battery module having a multiplicity of battery cells (4), wherein the battery module (1) has a housing (2) with an interior space (3) in which the multiplicity of battery cells (4) is accommodated, wherein a housing wall (5, 6) of the housing (2) has a multiplicity of projections (7) facing toward the interior space (3) of the housing (2), wherein in each case two adjacent projections (7) delimit a flow channel (8) designed for a flow of temperature-control fluid, wherein the multiplicity of battery cells (4) makes direct contact in each case with the multiplicity of projections (7).

16 Claims, 10 Drawing Sheets

(56) References Cited

U.S. PATENT DOCUMENTS

| | | | | |
|---|---|---|---|---|
| 2015/0050532 A1* | 2/2015 | Waigel | ................ | H01M 2/1005 |
| | | | | 429/61 |
| 2015/0200429 A1 | 7/2015 | Lee et al. | | |
| 2016/0093929 A1* | 3/2016 | Obasih | ................ | H01M 10/625 |
| | | | | 429/120 |
| 2017/0263903 A1* | 9/2017 | Petrevski | ............ | H01M 2/1077 |

FOREIGN PATENT DOCUMENTS

| | | |
|---|---|---|
| DE | 102013225582 A1 | 6/2015 |
| DE | 102014106949 A1 | 11/2015 |
| DE | 102016119967 A1 | 5/2017 |

* cited by examiner

BATTERY MODULE

BACKGROUND OF THE INVENTION

The invention proceeds from a battery module having a multiplicity of battery cells.

From the prior art, for the temperature control of battery modules, passive and active cooling concepts using air, water cooling circuits and arrangements in which individual battery cells of the battery module are flowed around are known.

Document DE 10 2012 217 874 A1 discloses a device for guiding a fluid, in particular a cooling fluid for cooling components to be cooled, in particular for cooling electronics components and/or battery cells and/or battery modules, having a first cover plate and a second cover plate and having a structural lattice between the two cover plates for the purposes of defining a space region through which flow can pass, wherein, for the at least partial sealing of the space region with respect to an exterior space and/or for the division of the space region into definable flow channels, a division by deformation of the structural lattice and/or by introduction of a sealing agent is provided.

Document DE 10 2013 203 966 A1 discloses a temperature-control plate for the temperature control of components, wherein the temperature-control plate is formed from a plastics-metal composite material which comprises a metal fiber fabric which is surrounded by a thermoset plastic.

SUMMARY OF THE INVENTION

A battery module having a multiplicity of battery cells having the features of the invention has the advantage that a simple construction of the battery module is possible with reliable temperature control of the multiplicity of battery cells.

For this purpose, a battery module having a multiplicity of battery cells is provided.

Here, the battery module has a housing with an interior space in which the multiplicity of battery cells is accommodated.

A housing wall of the housing has a multiplicity of projections which are arranged so as to face toward the interior space of the housing.

Here, in each case two adjacent projections delimit a flow channel designed for a flow of temperature-control fluid.

According to the invention, the multiplicity of battery cells makes direct contact in each case with the multiplicity of projections.

Advantageous refinements and improvements of the devices specified in the independent claims are possible by means of the measures specified in the dependent claims.

It is preferable for the housing wall to form the multiplicity of projections. In other words, this means that the multiplicity of projections is an integral constituent part of the housing wall.

It is expedient if the battery module comprises a first connector designed for the admission of temperature-control fluid into the interior space of the housing, and if the battery module comprises a second connector designed for the discharge of temperature-control fluid out of the interior space of the housing.

Here, the first connector may be arranged at a first side surface of the battery module and the second connector may be arranged at a second side surface of the battery module. Here, the first side surface is in particular arranged so as to be situated opposite the second side surface. Furthermore, the first connector and the second connector may also be arranged at the same side surface of the battery module.

It is expedient if two directly mutually adjacently arranged battery cells are arranged so as to be spaced apart from one another with a spacing. In particular, spacer elements space the two directly mutually adjacently arranged battery cells apart from one another.

It is thus possible for a flow chamber to be formed between two directly mutually adjacently arranged battery cells.

Here, the multiplicity of projections have in particular in each case a first surface and a second surface. Here, the first surface delimits in each case a first flow channel and the second surface delimits in each case a second flow channel which differs from the first flow channel. The first surface and the second surface are advantageously formed parallel to one another. This offers the advantage of a simple construction and uniform temperature control of the multiplicity of battery cells.

It is also expedient if the first surfaces of the multiplicity of projections are formed in each case parallel to one another and/or the second surfaces of the multiplicity of projections are formed in each case parallel to one another.

According to one aspect of the invention, the battery cells are each of prismatic form. In this way, it is possible to provide a simple construction with reliable temperature control.

It is advantageous if the battery cells are arranged in each case with their largest surfaces directly adjacent to one another. Here, a battery cell has for example six surfaces, of which in each case always two surfaces preferably have an identical form.

By means of the arrangement of the battery cells with their largest surfaces in each case directly adjacent to one another, it is possible for the largest surface of the battery cells to be flowed around by temperature-control fluid and for the greatest possible temperature control to thus also be realized.

Here, the battery cells each have a longitudinal direction pointing parallel to the largest surface. Preferably, the longitudinal direction is in this case arranged in each case perpendicular to the first surface and/or to the second surface of the multiplicity of projections.

In this way, reliable temperature control with a relatively long flow path of the temperature-control fluid can be realized.

It is expedient if the first side surface of the battery module or else the identical side surface of the battery module have a longitudinal direction.

Here, the longitudinal direction of the first side surface of the battery module or the longitudinal direction of the identical side surface are arranged perpendicular to the first surface and/or to the second surface.

In this way, it is possible for temperature-control fluid to flow between two battery cells in order to pass from the first connector to the second connector.

In one advantageous aspect of the invention, the multiplicity of projections of the housing wall forms a multiplicity of first flow channels and a multiplicity of second flow channels.

Here, the multiplicity of first flow channels and the multiplicity of second flow channels are arranged such that temperature-control fluid flows from one of the first flow channels into one of the second flow channels between two directly mutually adjacently arranged battery cells.

In this way, it is advantageously possible for temperature-control fluid to control the temperature of the battery cells over a large area.

In particular, the housing wall furthermore forms a first manifold flow channel which is directly connected in fluid-conducting fashion to the first connector and to the flow channels of the multiplicity of first flow channels.

In particular, the housing wall furthermore forms a second manifold flow channel which is directly connected in fluid-conducting fashion to the second connector and to the flow channels of the multiplicity of second flow channels.

In this way, it is possible for temperature-control fluid flowing into the housing through the first connector to be distributed uniformly between the multiplicity of first flow channels.

Furthermore, it is possible in this way for temperature-control fluid flowing out of the housing through the second connector to flow uniformly out of the multiplicity of second flow channels.

Here, the first manifold flow channel has a first longitudinal direction and the second manifold flow channel has a second longitudinal direction.

It is preferable here for the first longitudinal direction to be arranged perpendicular to the first surfaces of the projections of the first multiplicity of flow channels.

It is preferable here for the second longitudinal direction to be arranged perpendicular to the first surfaces of the projections of the second multiplicity of flow channels.

Such a design offers the advantage that temperature-control fluid can in a reliable manner be distributed uniformly between all of the flow channels and can be discharged uniformly from all of the flow channels.

It is expedient if the multiplicity of battery cells are braced together by means of a bracing element, for example a bracing strap. In this way, the battery cells can be reliably arranged in the housing of the battery module and in particular also reliably pressed together.

It is furthermore also advantageous if the battery module comprises a sealing element which surrounds the battery cells in encircling fashion.

In this way, it is possible for the interior space of the housing to be sealed off with respect to the surroundings.

BRIEF DESCRIPTION OF THE DRAWINGS

Embodiments of the invention are illustrated in the drawings and will be discussed in more detail in the following description.

In the drawings.

DETAILED DESCRIPTION

Figure 1:
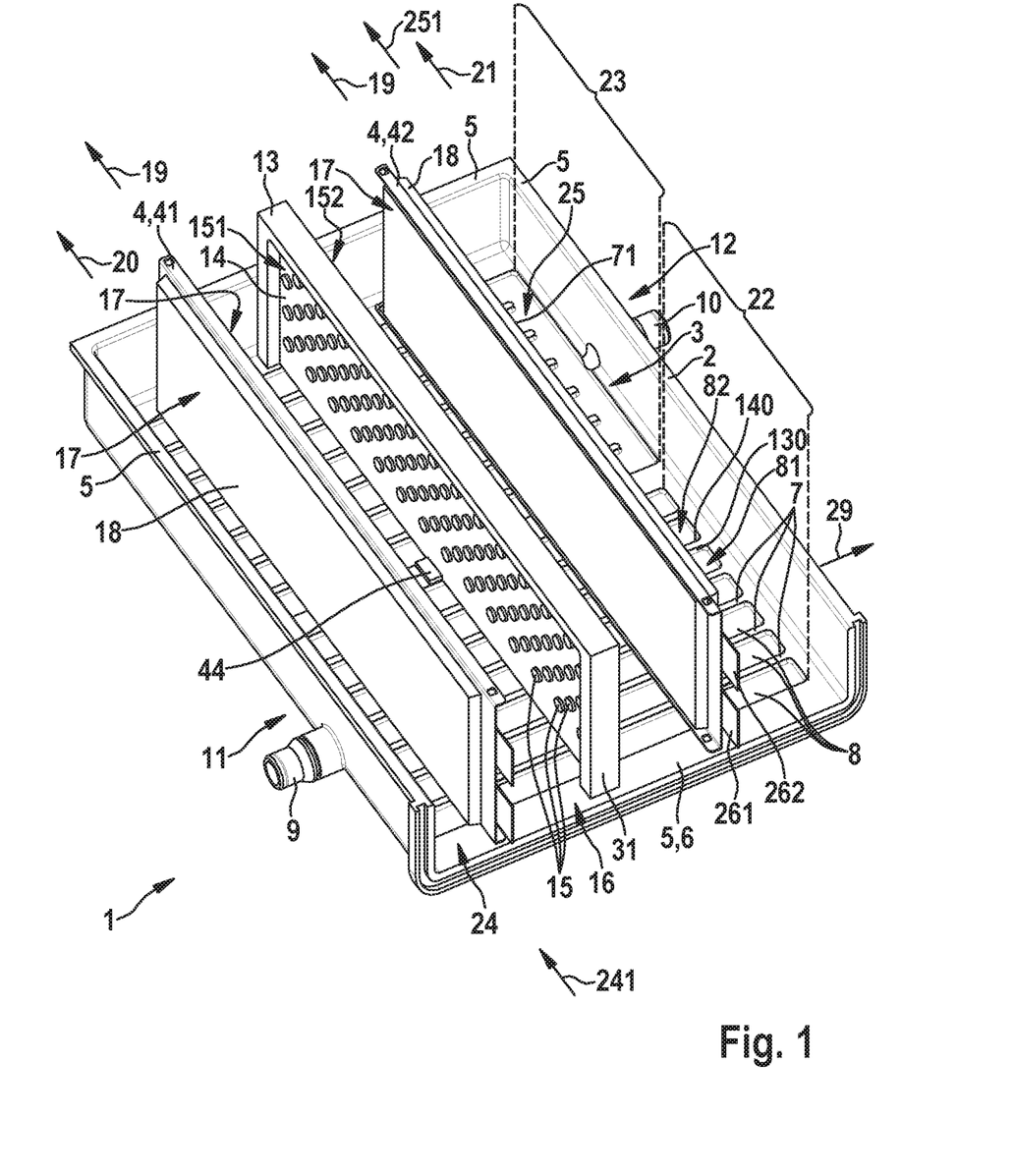
FIG. 1 schematically shows, in a perspective view, an opened housing of a battery module according to the invention with two battery cells and one flow-guiding element, FIG. 2 schematically shows, in a view from below, a battery module according to the invention with an opened housing, FIG. 3 schematically shows, in a side view, an embodiment of a flow-guiding element according to the invention which is arranged in a battery module according to the invention.

FIG. 1 schematically shows, in a perspective view, an opened housing 2 of a battery module 1 according to the invention.

Here, the housing 2 has an interior space 3.

The interior space 3 is in this case designed to accommodate a multiplicity of battery cells 4.

The interior space 3 of the housing 2 as per FIG. 1 in this case accommodates for example two battery cells 4, and shows a state before the final assembly of the battery module 1, with an opened housing 2.

Furthermore, the housing 2 comprises a multiplicity of housing walls 5.

The housing wall 5 at the lower side of the housing 2, which can also be referred to as base wall 6, has a multiplicity of projections 7. Here, two adjacent projections 7 delimit in each case one flow channel 8 which is designed for a throughflow of a temperature-control fluid.

Here, the multiplicity of projections 7 is arranged so as to face toward the interior space 3.

As can be seen from FIG. 1, the battery cells 4 make direct contact in each case with the multiplicity of projections 7.

In particular, in each case one lower side surface or base surface of the battery cells 4 makes direct contact with the projections 7.

In other words, the battery cells 4 stand directly on the projections 7.

In the exemplary embodiment shown in FIG. 1, the housing wall 5 or the base wall 6 forms the multiplicity of projections 7.

In other words, this means that the multiplicity of projections 7 are an integral constituent part of the housing 5 or of the base wall 6.

It can also be seen from FIG. 1 that the battery module 1 comprises a first connector 9 which is designed for the admission of temperature-control fluid into the interior space 3 of the housing 2.

It can also be seen from FIG. 1 that the battery module 1 comprises a second connector 10, which is designed for the discharge of temperature-control fluid out of the interior space 3 of the housing 2.

In the exemplary embodiment shown in FIG. 1, the first connector 9 is arranged at a first side surface 11 of the battery module 1.

In the exemplary embodiment shown in FIG. 1, the second connector 10 is arranged at a second side surface 12 of the battery module 1.

Here, the first side surface 11 is in particular arranged so as to be situated opposite the second side surface 12.

Furthermore, it is however also possible for the first connector 9 and the second connector 10 to be arranged together at the first side surface 11 or together at the second side surface 12, as will be described in more detail in conjunction with further figures.

In other words, this means that the first connector 9 and the second connector 10 are arranged at the same side surface 11, 12.

It can also be seen from FIG. 1 that the battery module 1 may comprise a flow-guiding element 13.

Here, the flow-guiding element 13 will be described in more detail in conjunction with the following figures, and is arranged directly adjacent to a battery cell 4.

Here, the flow-guiding element 13 comprises a main body 14 and spacer elements 15.

The spacer elements 15 are in this case arranged such that the spacer elements 15 space the main body 14 apart from the battery cell 4 arranged directly adjacent to the respective flow-guiding element 13.

In particular, the spacer elements 15 make direct contact in each case with the battery cell 4 arranged directly adjacent to the flow-guiding element 13.

Here, a first flow chamber 16 is formed between the main body 14 and the respective battery cell 4 as a result of the spacing of the main body 14 from the respective battery cell 4 by means of the spacer elements 15.

It is pointed out at this juncture that the battery cells 4 shown in FIG. 1 have, during a process of assembly of the battery module 1, been moved toward one another until the battery cells 4 make direct contact in each case with the spacer elements 15.

In this way, two directly mutually adjacent battery cells 4 have been arranged so as to be spaced apart from one another with a spacing.

In particular, here, the spacer elements 15 and the main body 14 of the flow-guiding element 13 space the two directly mutually adjacently arranged battery cells 4 apart from one another.

The multiplicity of projections 7 have in each case a first surface 130 and a second surface 140.

Here, the first surface 130 is in particular arranged so as to be situated opposite the second surface 140.

Here, the first surface 130 delimits a first flow channel 81 and the second surface 140 delimits a second flow channel 82.

It is preferable if, as per FIG. 1, the first surface 130 and the second surface 140 are formed parallel to one another.

It can also be seen from FIG. 1 that the first surfaces 130 of the multiplicity of projections 7 are each formed parallel to one another, and/or that the second surfaces 140 of the multiplicity of projections 7 are each formed parallel to one another.

In particular, the battery cells 4 shown in FIG. 1 are each of prismatic form and have a prismatic cell housing 18.

Furthermore, FIG. 1 also shows that the battery cells 4 are arranged in each case with their largest surfaces 17 directly adjacent to one another.

Here, the flow-guiding element 13 may be arranged between the two largest surfaces 17 of the respective two directly mutually adjacently arranged battery cells 4.

In particular, the flow-guiding element 13 is in this case arranged at a largest side surface 17 of the battery cell 4 of prismatic form.

The battery cells 4 each have a longitudinal direction 19 pointing parallel to the largest surface 17.

Here, the longitudinal direction 19 of the battery cells 4 is in each case arranged perpendicular to the first surfaces 130 and/or to the second surfaces 140 of the multiplicity of projections 7.

Furthermore, the first side surface 11 of the battery module 1 has a longitudinal direction 20 and the second side surface 12 of the battery module 1 has a longitudinal direction 21.

Here, the longitudinal direction 20 of the first side surface 11 is arranged perpendicular to the first surfaces 130 and/or to the second surfaces 140 of the multiplicity of projections 7, and the longitudinal direction 21 of the second side surface 11 is arranged perpendicular to the first surfaces 130 and/or to the second surfaces 140 of the multiplicity of projections 7.

Furthermore, the multiplicity of projections 7 of the housing wall 5 or of the base wall 6 form a multiplicity of first flow channels 22 and a multiplicity of second flow channels 23.

As will be described in more detail in conjunction with the further figures, the multiplicity of first flow channels 22 and the multiplicity of second flow channels 23 are arranged such that temperature-control fluid flows between two directly mutually adjacent battery cells 4 in order to pass from one of the first flow channels 22 into one of the second flow channels 23. In particular, the temperature-control fluid flows here through the first flow chamber 16 that is formed.

Here, the housing wall 5 or the base wall 6 furthermore forms a first manifold flow channel 24 (not visible in FIG. 1).

Here, the first manifold flow channel 24 is directly connected in fluid-conducting fashion to the first connector 9 of the housing 2 and is furthermore also directly connected in fluid-conducting fashion to the flow channels 8 of the multiplicity of first flow channels 22.

Here, the housing wall 5 or the base wall 6 furthermore forms a second manifold flow channel 25.

Here, the second manifold flow channel 25 is directly connected in fluid-conducting fashion to the second connector 10 of the housing 2 and is furthermore also directly connected in fluid-conducting fashion to the flow channels 8 of the multiplicity of second flow channels 23.

Such an embodiment offers the advantage, for example, that temperature-control fluid flowing through the first connector 9 into the interior space 3 of the housing 2 can be distributed uniformly between the flow channels 8 of the multiplicity of first flow channels 22 and that temperature-control fluid flowing through the second connector 10 out of the interior space of the housing can be merged uniformly from the flow channels 8 of the multiplicity of second flow channels 23.

Here, the first manifold flow channel 24 has a first longitudinal direction 241 and the second manifold flow channel 25 has a second longitudinal direction 251.

Here, the first longitudinal direction 241 of the first manifold flow channel 24 is arranged perpendicular to the first surfaces 130 and/or to the second surfaces 140 of the projections 7 which form the multiplicity of first flow channels 22.

Here, the second longitudinal direction 251 of the second manifold flow channel 25 is arranged perpendicular to the first surfaces 130 and/or to the second surfaces 140 of the projections 7 that form the multiplicity of second flow channels 23.

Such an embodiment offers the advantage, for example, that uniform distribution and merging of temperature-control fluid is possible.

Furthermore, FIG. 1 also shows that the battery cells 4 each have a positive voltage terminal 261 and a negative voltage terminal 262, which may be arranged for example at the same side surfaces of the battery cells 4.

Figure 2:
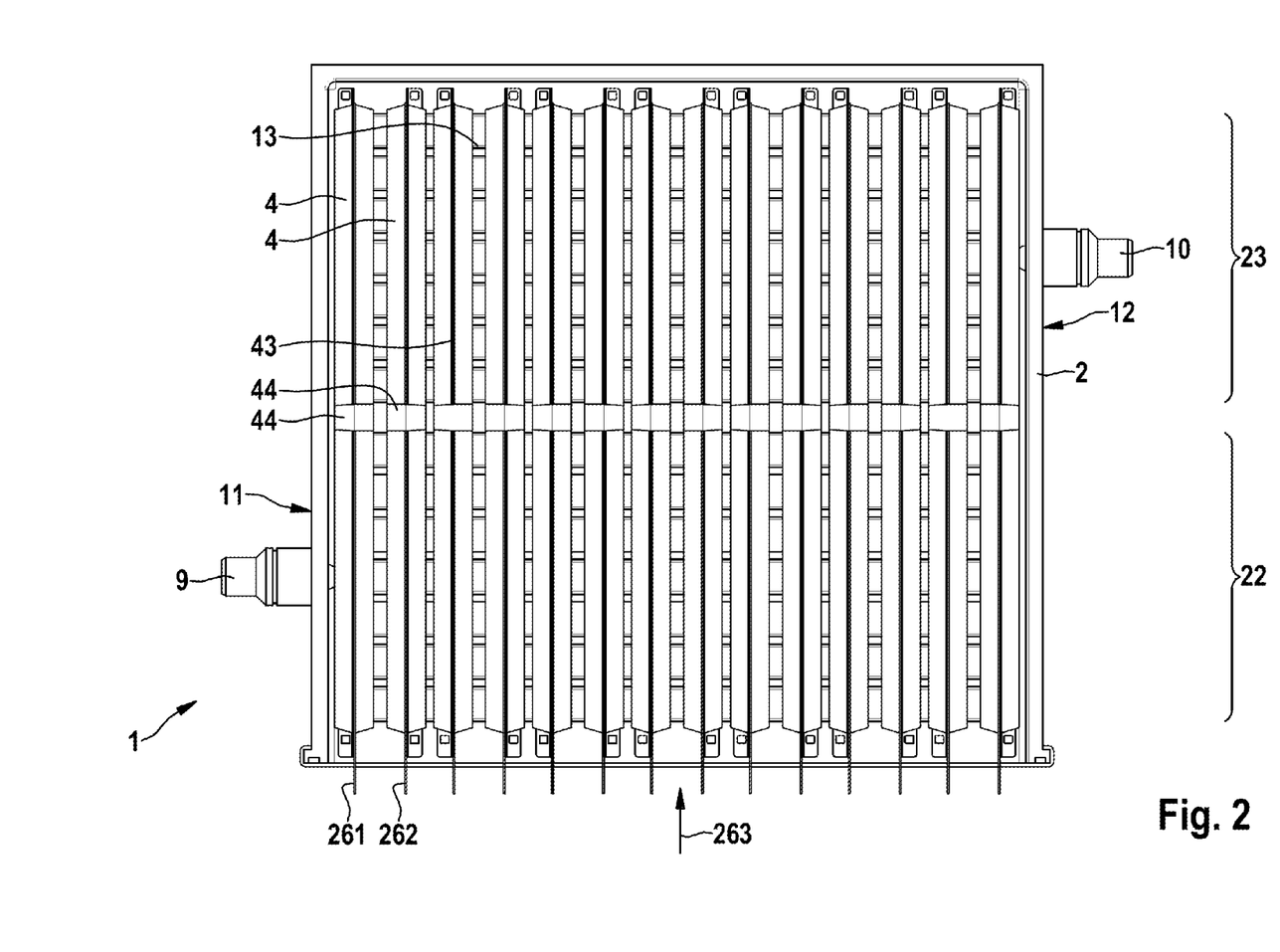

FIG. 2 schematically shows, in a view from below, a battery module 1 according to the invention with an opened housing 2.

The housing 2 shown in FIG. 2 corresponds to the housing 2 described in FIG. 1, wherein a multiplicity of fourteen battery cells 4 are now accommodated in the housing 2 in FIG. 2.

Here, the base wall 6 of the housing 2 cannot be seen in FIG. 2.

It can also be seen here that in each case two directly mutually adjacently arranged battery cells 4 are spaced apart from one another with a spacing, wherein a flow-guiding element 13 is arranged between two directly mutually adjacently arranged battery cells 4.

Here, the flow-guiding element 13, in particular the spacer elements 15 and the main body 14, space the two directly mutually adjacently arranged battery cells 4 apart from one another.

The first connector 9 and the second connector 10 can also be seen in FIG. 2.

Furthermore, FIG. 2 shows that the voltage terminals 261, 262 of the battery cells 4 are arranged at one side surface 263; in particular, the positive voltage terminals 261 and the negative voltage terminals 262 are arranged at the side surface 263.

Here, the side surface 263 is arranged perpendicular to the first side surface 11 and perpendicular to the second side surface 12.

FIG. 2 illustrates once again that temperature-control fluid flows through between the battery cells 4 in order to be able to flow from the first connector 9 to the second connector 10.

In particular, the flow-guiding elements 13 in each case also have flow guides 44 which can for example also be seen in FIG. 1, wherein the flow guides 44 are arranged in each case between the multiplicity of first flow channels 22 and the multiplicity of second flow channels 23. The flow guides 44 are in this case arranged so as to also make direct contact with in each case one projection 7.

In this way, it can advantageously be achieved that temperature-control fluid follows a longer flow path through the first flow chamber 16, such that the cooling effect can be intensified.

In particular, FIG. 2 also shows a lower side surface 43 of the battery cells 4, which are arranged so as to make direct contact with the projections 7.

Figure 3:
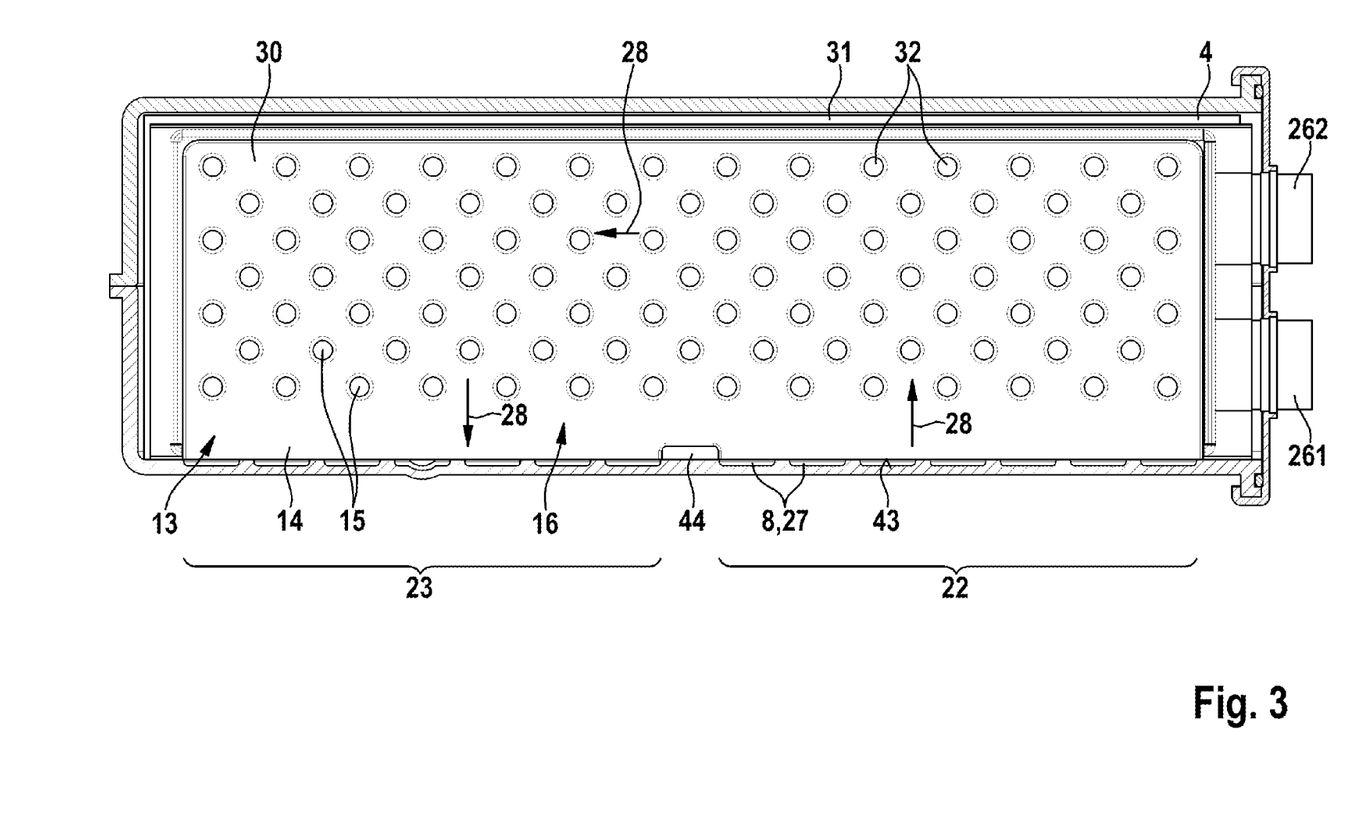

FIG. 3 schematically shows an embodiment of a flow-guiding element 13 according to the invention, which is arranged in a battery module 1 according to the invention, in a side view.

Here, the flow-guiding element 13 has, as already described, a main body 14 and a multiplicity of spacer elements 15. Here, the spacer elements 15 are designed to space the main body 14 apart from a battery cell 4, whereby a first flow chamber 16 is formed.

Furthermore, as already described in conjunction with FIG. 1, the battery module 1 has flow channels 8 which, in the context of FIG. 3, are in particular also referred to as second flow chamber 27.

Here, the second flow chamber 27 is connected in fluid-conducting fashion to the first flow chamber 16, such that temperature-control fluid can flow directly from the first flow chamber 16 into the second flow chamber 27.

It is pointed out at this juncture that FIG. 3 in particular also shows the multiplicity of first flow channels 22 and the multiplicity of second flow channels 23.

In order that temperature-control fluid can pass from a flow channel 8 of the multiplicity of first flow channels 22 into a flow channel 8 of the multiplicity of second flow channels 23, the temperature-control fluid flows through between two directly mutually adjacently arranged battery cells 4, wherein the temperature-control fluid flows in particular through the first flow chamber 16, as is intended to be indicated by the arrows denoted by the reference designation 28.

In particular, here, the first flow chamber 16 is designed such that temperature-control fluid flows from the second flow chamber 27 into the first flow chamber 16 substantially by means of the capillary effect.

This is for example also to be understood to mean that the main body 14 and the spacer elements 15 of the flow-guiding element 13 are designed, and furthermore arranged on the battery cell 4, in such a way that temperature-control fluid flows from the second flow chamber 27 into the first flow chamber 16 substantially by means of the capillary effect.

Furthermore, FIG. 3 also shows a battery cell 4 which is of prismatic form and which has a positive voltage terminal 261 and a negative voltage terminal 262.

The second flow chamber 27 or the flow channels 8 of the multiplicity of first flow channels 22 and of the multiplicity of second flow channels 23, is/are preferably arranged at a lower side surface 43 of the battery cells 4. In other words, this means in particular that temperature-control fluid flows from the first flow chamber 27 into the second flow chamber 26 counter to the direction of action of gravitational force.

Here, the second flow chamber 27 has a longitudinal direction 29, which is shown in FIG. 1 and which is perpendicular to the plane of the drawing in FIG. 3.

Furthermore, the first flow chamber 16 has a flow plane 30 which corresponds to the plane of the drawing in FIG. 3.

Here, the longitudinal direction 29 of the second flow chamber 27 is arranged perpendicular to the flow plane 30 of the first flow chamber 16.

Here, the spacer elements 15 as per FIG. 3 are of elastically deformable form, and thus the spacer elements 15 can serve for example for a compensation of volume expansions of the battery cells 4.

As can in particular also be seen from FIG. 1, the battery module 1 has a first battery cell 41 and a second battery cell 42, between which the flow-guiding element 13 is arranged.

Here, the flow-guiding element 13 has first spacer elements 151 and second spacer elements 152, which are not visible in FIG. 1. Here, the first spacer elements 151 space the main body 14 apart from the first battery cell 41 and the second spacer elements 152 space the main body 14 apart from the second battery cell 42.

It can also be seen from FIGS. 1 and 3 that the spacer element 13 comprises a frame 31 which closes off the first flow chamber 16. In particular, this is for example also to be understood to mean that the first flow chamber 16 is delimited by six delimiting surfaces, wherein the battery cell 4 forms one delimiting surface, the main body 14 forms one delimiting surface, and the frame 31 forms three delimiting surfaces.

Furthermore, the projections 7 also partially form a further delimiting surface, such that temperature-control fluid can flow into the first flow chamber 16 only from the flow channels 8 of the multiplicity of first flow channels 22 and the temperature-control fluid can flow out of the first flow chamber 16 only into the flow channels 8 of the multiplicity of second flow channels 23.

Here, the frame 31 can accommodate the battery cell 4, which is to be understood to mean that the frame 31 partially encompasses the battery cell 4.

Here, the multiplicity of spacer elements 15 as per FIG. 3 each have a cross-sectional area 32 which has a circular shape.

It is however also possible for the cross-sectional areas 32 to have an oval or half-moon shape.

In this way, reliable flow guidance within the first flow chamber 16 is possible, which can control the temperature of the entire battery cell 4 over a large area.

Here, the main body 14 of the flow-guiding element 13 is preferably formed from a polymer material, for example so as to prevent electrical contacting between two battery cells 4 or so as not to unduly increase the weight of the battery module 1, for example.

Figure 4A:
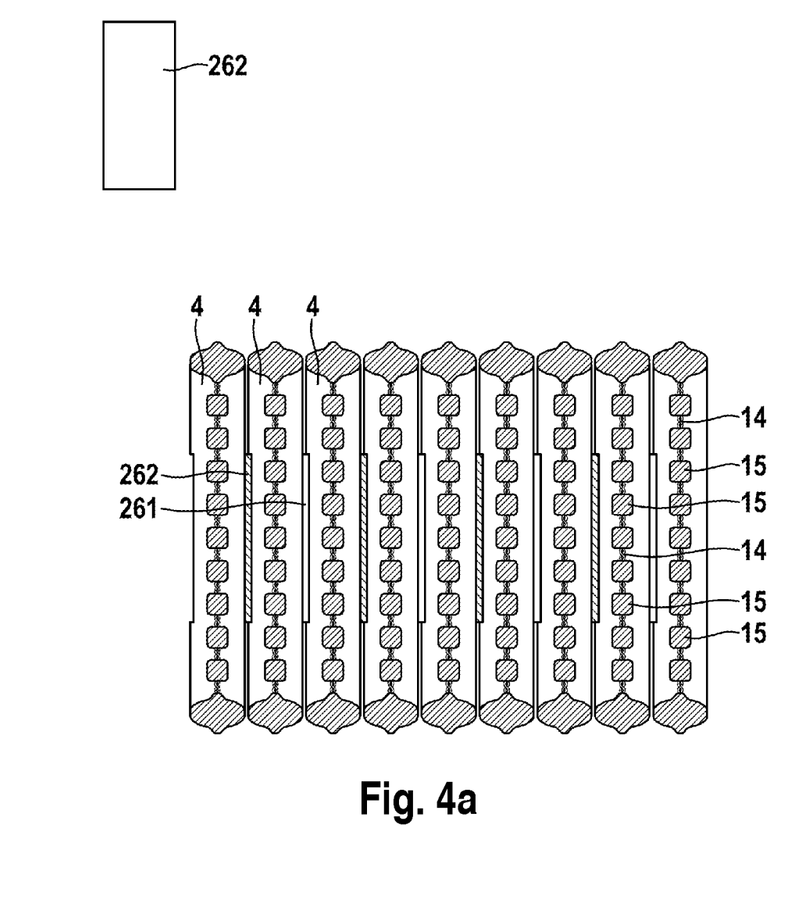
FIG. 4a shows a multiplicity of battery cells with flow-guiding elements.
Figure 4B:
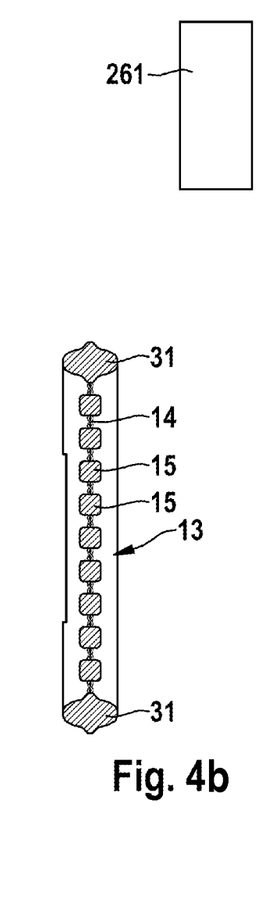
FIG. 4b shows a side view of a flow-guiding element.

FIG. 4 shows, in the lower right-hand illustration, a side view of a flow-guiding element 13, and in the lower left-hand illustration, a multiplicity of battery cells 4 with flow-guiding elements 13.

It can be seen here that the flow-guiding element 13 has a main body 14, which is preferably formed from a polymer material.

Also shown are spacer elements 15, wherein the spacer elements 15 may be formed from a polymer material or else from a ceramic material.

For example, the spacer elements 15 may be formed from oxide particles.

Furthermore, the spacer element 15 may in this case be accommodated within the main body 14 or mounted onto the main body 14.

Also shown is the frame 31, which peripherally fully encompasses the battery cells 4.

By contrast to FIGS. 1 to 3, the frame encompasses the battery cells 4 over the full circumference, as will be discussed in more detail in conjunction with FIG. 5.

The upper illustration of FIG. 4 shows a further embodiment of a battery cell 4, in the case of which the positive voltage terminal 261 and the negative voltage terminal 262 are arranged at opposite side surfaces.

It is therefore the case in the lower left-hand illustration that a positive voltage terminal 261 and a negative voltage terminal 262 are shown always in alternation.

Figure 5:
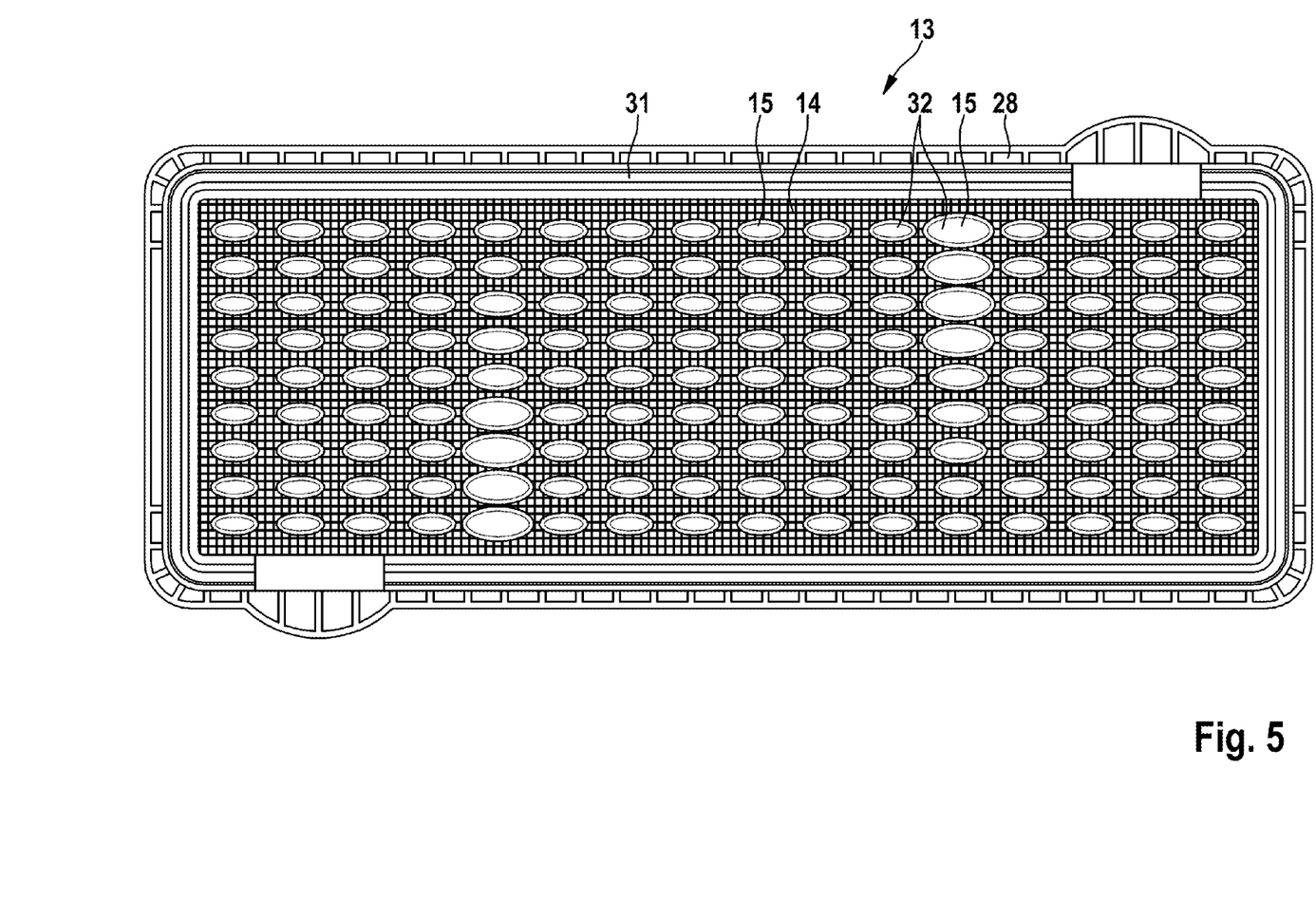
FIG. 5 shows an embodiment of a flow-guiding element.

FIG. 5 shows a further embodiment of a flow-guiding element 13.

Here, the main body 14 can be seen, which is formed from a polymer material.

The main body 14 may for example comprise a mesh structure.

Here, the mesh structure may by all means be formed such that temperature-control fluid can flow through the main body 14.

Furthermore, it can also be seen from FIG. 5 that the spacer elements 15 may have a different cross-sectional area 32.

The flow-guiding element 13 as per FIG. 5 comprises in this case a frame 31 which peripherally fully encompasses the main body 14.

Here, the battery cell 4 is also fully encompassed by the frame 31, such that the frame closes off the first flow chamber 16, such that temperature-control fluid can flow through the first flow channel 16.

Here, the main body 14 is in particular fastened in the frame 31.

Figure 6:
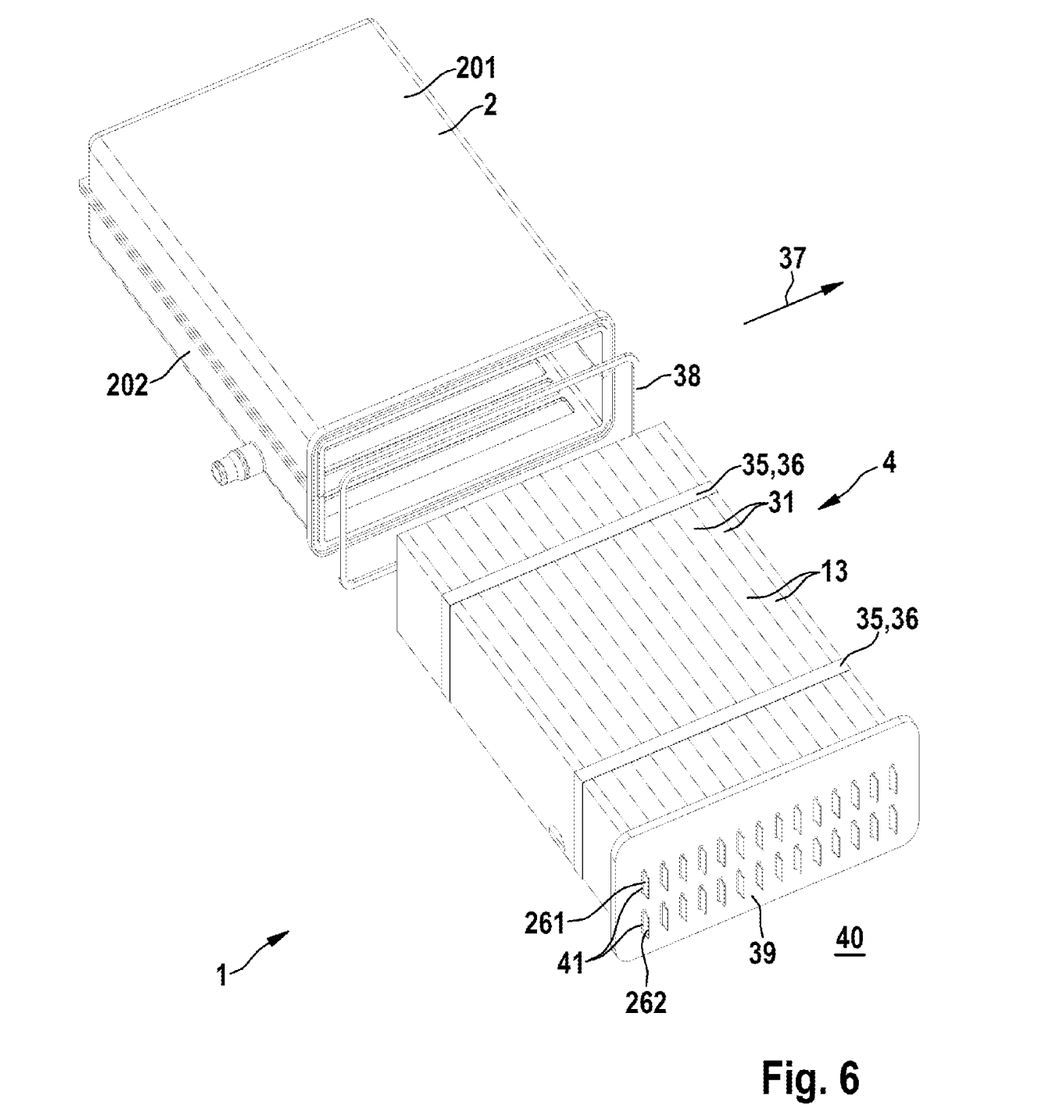
FIG. 6 shows, in a perspective view, a battery module in an exploded illustration.

FIG. 6 shows, in a perspective illustration, a battery module 1 in an exploded illustration.

Here, in FIG. 6 shows the housing 2 which, by contrast to FIGS. 1 and 2, is illustrated in closed form.

It can also be seen in FIG. 6 that the multiplicity of battery cells 4 are arranged adjacent to one another and that in each case one flow-guiding element 13 is arranged between two directly mutually adjacently arranged battery cells 4.

Here, the frame 31 of the flow-guiding elements 31 encompasses the battery cells 4 in each case, such that the battery cells 4 cannot be seen in FIG. 6.

Furthermore, the battery cells 4 and the flow-guiding elements 13 are braced together by means of bracing elements 35 in the form of bracing straps 36. Here, the bracing elements 35 have a longitudinal direction 37, wherein the longitudinal direction 37 of the bracing elements 35 points along the longitudinal direction 29 of the flow channels 8.

In this way, the bracing elements 35 can be arranged such that the bracing elements 35 fully encompass the battery cells 4, and nevertheless the battery cells 4 can be arranged so as to make direct contact with the projections 7.

Furthermore, the battery module 1 has a sealing element 38, which surrounds the multiplicity of battery cells 4 in encircling fashion such that the interior space 3 of the housing 2 of the battery module 1 is sealingly closed off with respect to the surroundings 40.

Furthermore, the battery module 1 has a cover element 39 which closes off the interior space 3 with respect to the surroundings 40.

As can be seen from FIG. 6, the cover element 39 has openings 41 for the leadthrough of the positive voltage terminals 261 and of the negative voltage terminals 262, such that a series and/or parallel electrical interconnection of the individual battery cells 4 is possible from the surroundings 4 of the battery module 1.

In this regard, it is pointed out at this juncture that, in particular, the frame 31 of the flow-guiding element 13 is designed to seal off the positive voltage terminal 261 and the negative voltage terminal 262 with respect to the first flow chamber 16 and the second flow chamber 27.

In particular, FIG. 6 also shows that the housing 2 has a housing upper part 201 and a housing lower part 202.

Figure 7:
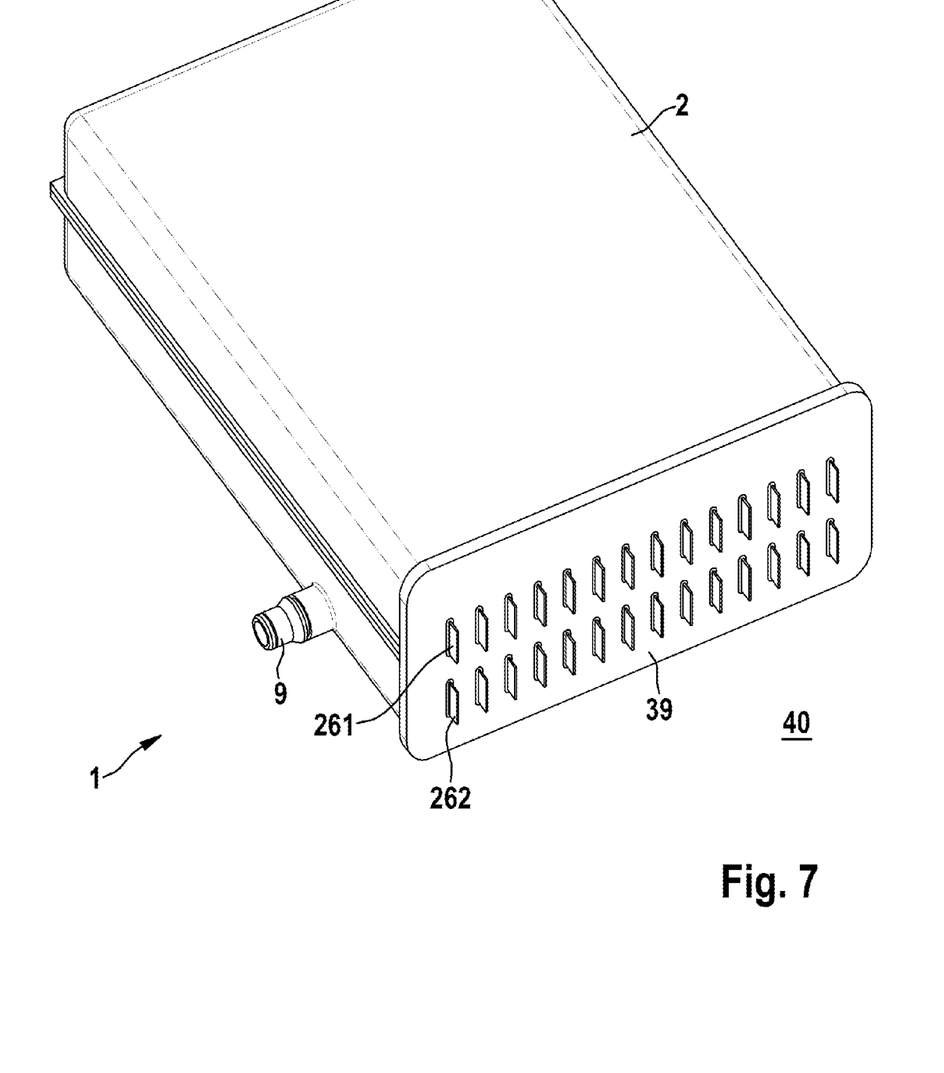
FIG. 7 shows, in a perspective view, a battery module according to the invention, FIG. 8 schematically shows, in a perspective view, an opened housing of a further battery module according to the invention with a battery cell comprising spacer elements.

FIG. 7 shows, in a perspective view, a battery module 1.

Here, the positive voltage terminals 261 and the negative voltage terminals 262 for a series and/or parallel electrical interconnection are accessible from the surroundings 40.

Furthermore, the housing 2 of the battery module 1 has the first connector 9 and the second connector 10, which is not visible in FIG. 7, and said housing is otherwise closed off in fluid-tight fashion with respect to the surroundings 40.

Figure 8:
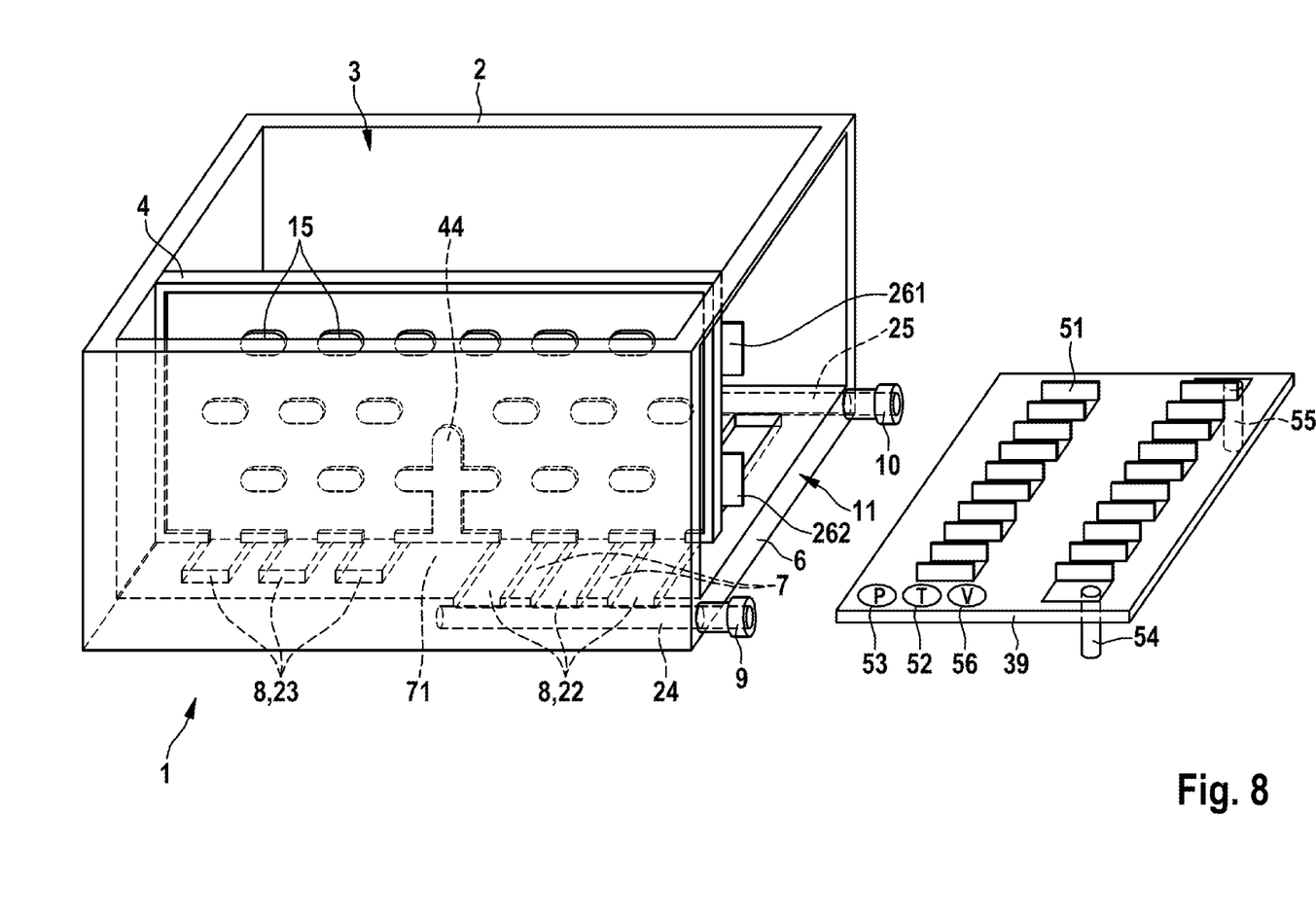

FIG. 8 shows a further embodiment of a battery module 1 according to the invention in a perspective view.

Here, in FIG. 8, it is possible firstly to see the housing 2 of the battery module 1, which has an interior space 3 for accommodating a multiplicity of battery cells 4.

Here, the base wall 6 of the housing 2 has a multiplicity of projections 7, wherein in each case two adjacent projections 7 form flow channels 8. In particular, the projections 7 form a multiplicity of first flow channels 22 and a multiplicity of second flow channels 23.

Furthermore, the battery module 1 has a first connector 9 and a second connector 10.

Furthermore, the battery module 1 has a first manifold flow channel 24 and a second manifold flow channel 25.

Here, as can be seen from FIG. 8, the first manifold flow channel 24 is directly connected in fluid-conducting fashion to the multiplicity of first flow channels 22 and is directly connected in fluid-conducting fashion to the first connector 9.

Here, in a manner which is not visible in FIG. 8, the second manifold flow channel 25 is connected in fluid-conducting fashion to the multiplicity of second flow channels 23 and is directly connected in fluid-conducting fashion to the second connector 10.

Here, the housing wall 6 furthermore forms, for example, a separating projection 71 which separates a flow channel 8 of the multiplicity of first flow channels 22 and a flow channel 8 of the multiplicity of second flow channels 23 from one another.

It is self-evidently also possible for the embodiment of a battery module 1 described in conjunction with FIGS. 1 to 6 to have a separating projection 71 of said type.

In this regard, it is pointed out that the battery cell 4 as per FIG. 8 may also have a flow guide 44 which is arranged directly adjacent to the separating projection 71, as is also the case in the battery module 1 as per FIGS. 1 to 6.

Here, the battery cell 4 also has a positive voltage terminal 261 and a negative voltage terminal 262.

In the description of the further embodiment, shown in FIG. 8, of the battery module 1, it is initially primarily the intention to discuss only the differences in relation to the embodiments already described.

The first connector 9 for an admission of temperature-control fluid into the interior space 3 of the housing 2 of the battery module 1 and the second connector 10 for a discharge of temperature-control fluid out of the interior space 3 of the housing 2 of the battery module 1 are in this case arranged at the same side surface 11.

Furthermore, the embodiment of the battery module 1 as per FIG. 8 has a cover element 39 which has a multiplicity of cell connectors 51, which can electrically interconnect the multiplicity of first voltage terminals 261 and the multiplicity of second voltage terminals 262 in series and/or in parallel.

Here, the cover element 39 is also arranged at the side surface 11 of the battery module 1, and differs here from the embodiment of the battery module 1 as per FIGS. 1 and 6.

Here, the cover element 39 may also comprise the positive module voltage terminal 54 and the negative module voltage terminal 55.

Furthermore, the cover element 39 may comprise a temperature sensor 52 which is designed for measuring a temperature in the interior space 3.

Furthermore, the cover element 39 may comprise a pressure sensor 53 which is designed for measuring a pressure in the interior space 3 and thus in particular for identifying damage that gives rise to changes in pressure.

Furthermore, the cover element 39 may also have a voltage sensor 56 which is connected in electrically conductive fashion to a cell connector 51 and which can pick off the electrical voltage at said cell connector.

By contrast to the embodiment of the battery module 1 shown in FIGS. 1 and 6, it is in particular the case in the embodiment of the battery module 1 as per FIG. 8 that the battery cells 4 comprise spacer elements 15, wherein the invention is not restricted to such an embodiment.

Figure 9:
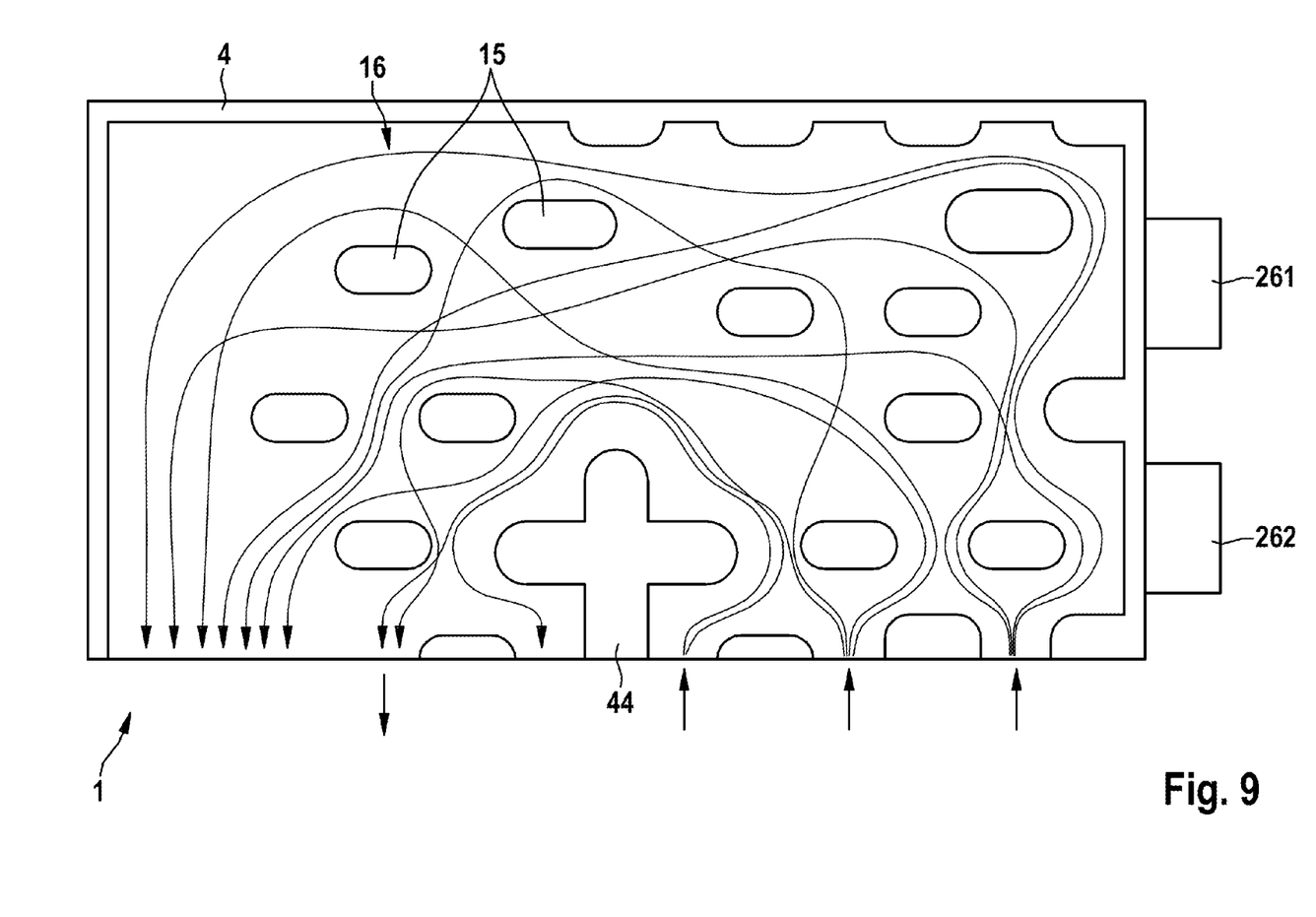
FIG. 9 shows, in a sectional view, a further battery module according to the invention with a battery cell comprising spacer elements.

FIG. 9 shows, in a sectional view, a battery module 1.

Here, one battery cell 4 is shown, which comprises spacer elements 15.

The battery cell 4 furthermore has a positive voltage terminal 261 and a negative voltage terminal 262.

Here, the spacer elements 15 are arranged such that they can influence the flow of the temperature-control fluid in the first flow chamber 16 in targeted fashion.

In particular, the flow guide 44 that is shown is designed to prevent temperature-control fluid from flowing directly from one of the flow channels 8 of the multiplicity of first flow channels 22 into one of the flow channels 8 of the multiplicity of second flow channels 23, with said temperature-control fluid rather following a relatively long flow path through the first flow chamber 16.

Figure 10:
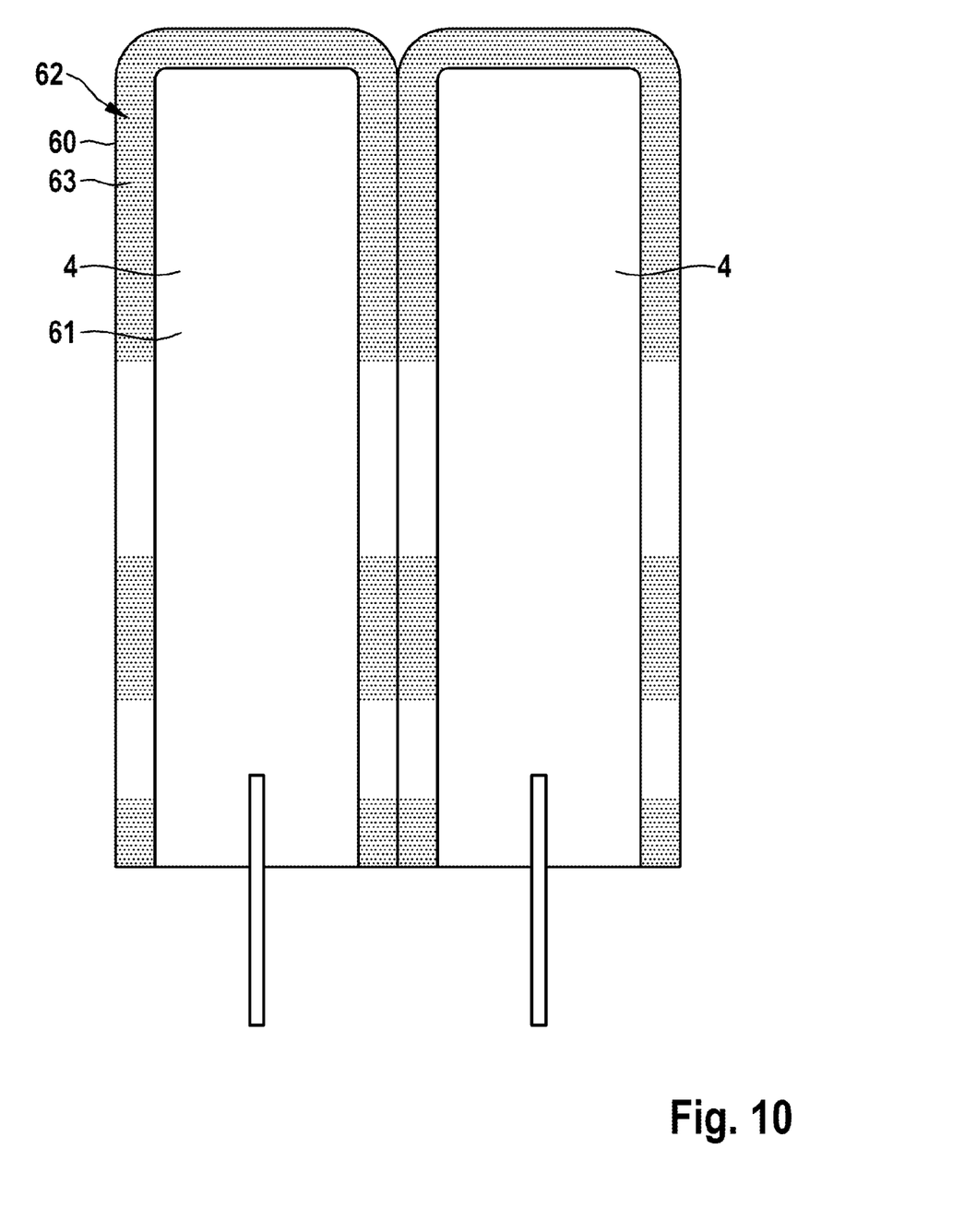
FIG. 10 shows battery cells with a casing according to the invention.

FIG. 10 shows battery cells 4 which have a casing 60.

Here, two battery cells 4 are shown, which are arranged directly adjacent to one another.

Here, the battery cells 4 each have a housing 61, in which the electrochemical components (not illustrated) of the battery cell 4 are accommodated.

Here, the housing 61 of the battery cell 4 comprises the casing 60. Here, the casing 60 is designed for guiding a temperature-control fluid flowing around the battery cell 4.

Here, the casing 60 in particular at least partially covers the housing 61 of the battery cell 4.

The casing 60 is in this case formed from a main body 62 which comprises at least one filler material 63.

The housings 61 of the battery cells 4 are preferably of prismatic form.

Here, the main body 62 is formed from a fabric which is at least one layer.

Here, the casing 60 is preferably of an elastically deformable form in order to be able to compensate changes in volume of the battery cells 4.

The casing 60 and/or the filler material 63 are in this case preferably formed such that the casing 60 or the filler material 63 swells, that is to say increases in volume, when it comes into contact with the temperature-control fluid or with the cooling medium.

What is claimed is:

1. A battery module having a multiplicity of battery cells (4), wherein the battery module (1) has a housing (2) with an interior space (3) in which the multiplicity of battery cells (4) are accommodated, wherein the multiplicity of battery cells (4) are rectangular in shape and positioned parallel to one another, wherein a housing wall (5, 6) of the housing (2) has a multiplicity of projections (7) facing toward the interior space (3) of the housing (2),
    wherein adjacent projections of the multiplicity of projections (7) delimit a multiplicity of first flow channels (22) and a multiplicity of second flow channels (23),
    wherein each of the multiplicity of battery cells (4) makes direct contact with each of the multiplicity of projections (7),
    wherein a flow guiding element is positioned between a mutually adjacent pair of the multiplicity of battery cells (4), the flow guiding element being parallel to the multiplicity of battery cells (4), and
    wherein the multiplicity of first flow channels (22) are fluidly connected to the multiplicity of second flow channels (23) via a flow chamber (16) defined between the flow guiding element and one battery cell of the mutually adjacent pair of the multiplicity of battery cells (4), such that a temperature-control fluid flows from one of the multiplicity of first flow channels (22), into the flow chamber (16), and into one of the multiplicity of second flow channels (23).

2. The battery module according to claim 1, wherein the battery module (1) comprises a first connector (9) configured for the admission of temperature-control fluid into the interior space (3) of the housing (2), and the battery module (1) comprises a second connector (10) configured for the discharge of temperature-control fluid out of the interior space (3) of the housing (2), characterized in that
    the first connector (9) is arranged at a first side surface (11) of the battery module (1) and
    the second connector (10) is arranged at a second side surface (12) of the battery module (1) situated opposite the first side surface (11) of the battery module (1).

3. The battery module according to claim 1, characterized in that
the mutually adjacent pair of the multiplicity of battery cells (4) are arranged so as to be spaced apart from one another with a spacing.

4. The battery module according to claim 1, characterized in that
the multiplicity of projections (7) have in each instance a first surface (130) and a second surface (140) which delimit in each case a first flow channel (81) of the multiplicity of first flow channels (22) and a second flow channel (82) of the multiplicity of second flow channels (23),
wherein the first surface (130) and the second surface (140) are formed parallel to one another.

5. The battery module according to claim 4, characterized in that
the first surfaces (130) and/or the second surfaces (140) of each of the multiplicity of projections (7) are formed parallel to one another.

6. The battery module according to claim 1, characterized in that
the multiplicity of battery cells (4) are each of prismatic form.

7. The battery module according to claim 6, characterized in that
the multiplicity of battery cells (4) are arranged in each instance with their largest surfaces (17) directly adjacent to one another.

8. The battery module according to claim 7, wherein
the multiplicity of battery cells (4) each have a longitudinal direction (19) pointing parallel to the largest surface (17),
characterized in that the longitudinal direction (19) of each of the multiplicity of battery cells (4) is arranged perpendicular to the first surface (130) and/or to the second surface (140) of the multiplicity of projections (7).

9. The battery module according to claim 2,
the multiplicity of projections (7) have in each case a first surface (130) and a second surface (140) which delimit in each case a first flow channel (81) of the multiplicity of first flow channels (22) and a second flow channel (82) of the multiplicity of second flow channels (23), wherein the first surface (130) and the second surface (140) are formed parallel to one another, and
wherein the first side surface (11) or the second side surface (11, 12) has a longitudinal direction (20, 21), characterized in that the longitudinal direction (20) of the first side surface (11) or the longitudinal direction (20, 21) of the second side surface (11, 12) is arranged perpendicular to the first surface (130) and/or to the second surface (140).

10. The battery module according to claim 4, characterized in that
the housing wall (5, 6) furthermore forms a first manifold flow channel (24) which is directly connected in fluid-conducting fashion to a first connector (9) of the housing (2) and to the multiplicity of first flow channels (22),
and/or in that
the housing wall (5, 6) furthermore forms a second manifold flow channel (25) which is directly connected in fluid-conducting fashion to a second connector (10) of the housing (2) and to the multiplicity of second flow channels (23).

11. The battery module according to claim 10, wherein
the first manifold flow channel (24) has a first longitudinal direction (241) and
the second manifold flow channel (25) has a second longitudinal direction (251),
characterized in that
the first longitudinal direction (241) is arranged perpendicular to the first surfaces (130) of the multiplicity of projections (7) of the first multiplicity of first flow channels (22), and/or in that
the second longitudinal direction (251) is arranged perpendicular to the first surfaces (130) of the multiplicity of projections (7) of the multiplicity of second flow channels (23).

12. The battery module according to claim 1, characterized in that
the multiplicity of battery cells (4) are braced together by a bracing element (35).

13. The battery module according to claim 1, characterized in that
the battery module (1) comprises a sealing element (38) which surrounds the multiplicity of battery cells (4) in encircling fashion.

14. The battery module according to claim 1, wherein
the battery module (1) comprises a first connector (9) configured for the admission of temperature-control fluid into the interior space (3) of the housing (2), and the battery module (1) comprises a second connector (10) configured for the discharge of temperature-control fluid out of the interior space (3) of the housing (2),
characterized in that the first connector (9) and the second connector (10) are arranged at a side surface (11, 12) of the battery module (1).

15. The battery module according to claim 1, characterized in that
the mutually adjacent pair of the multiplicity of battery cells (4) are arranged so as to be spaced apart from one another with a spacing, wherein spacer elements (15) space the mutually adjacent pair of the multiplicity of battery cells (4) apart from one another.

16. The battery module according to claim 1, characterized in that
the multiplicity of battery cells (4) are braced together by a bracing strap (36).

* * * * *